US012233848B2

(12) United States Patent
Haria et al.

(10) Patent No.: US 12,233,848 B2
(45) Date of Patent: Feb. 25, 2025

(54) CONTROLS AND METHODS TO CALCULATE CLUTCH TORQUE TO INCLUDE SEAL FRICTION

(71) Applicant: FORD GLOBAL TECHNOLOGIES, LLC, Dearborn, MI (US)

(72) Inventors: Hiral Jayantilal Haria, Ypsilanti, MI (US); Yuji Fujii, Ann Arbor, MI (US); Akshay Bichkar, Ann Arbor, MI (US); Yang Xu, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 414 days.

(21) Appl. No.: 17/375,125

(22) Filed: Jul. 14, 2021

(65) Prior Publication Data
US 2023/0026225 A1    Jan. 26, 2023

(51) Int. Cl.
*B60W 20/40* (2016.01)
*B60W 10/02* (2006.01)
(Continued)

(52) U.S. Cl.
CPC ............ *B60W 20/40* (2013.01); *B60W 10/02* (2013.01); *B60W 10/06* (2013.01); *B60W 10/08* (2013.01); *B60W 2510/0225* (2013.01); *B60W 2510/0275* (2013.01); *B60W 2510/0291* (2013.01); *B60W 2510/107* (2013.01); *B60W 2510/1075* (2013.01); *B60W 2710/022* (2013.01); *B60W 2710/029* (2013.01)

(58) Field of Classification Search
CPC ...... B60W 20/40; B60W 10/02; B60W 10/06; B60W 10/08; B60W 2510/0225; B60W 2510/0275; B60W 2510/0291; B60W 2510/107; B60W 2510/1075; B60W 2710/022; B60W 2710/029
See application file for complete search history.

(56) References Cited

U.S. PATENT DOCUMENTS 9,039,570 B2    5/2015  Doering et al.
9,156,469 B2    10/2015  Gibson et al.
(Continued)

FOREIGN PATENT DOCUMENTS

DE    102004035262 A1 *  2/2006  ........... F16D 48/066
JP    2003205768 A    7/2003
JP    4341611 B2    10/2009

OTHER PUBLICATIONS

Machine Translation of DE 102004035262 A1 pdf File Name: "DE102004035262A1_Machine_Translation.pdf".*
(Continued)

*Primary Examiner* — Grant Moubry
*Assistant Examiner* — Ruben Picon-Feliciano
(74) *Attorney, Agent, or Firm* — Vincent Mastrogiacomo; Brooks Kushman P.C.

(57) ABSTRACT

A hybrid vehicle includes an engine, an electric machine, a disconnect clutch configured to selectively couple the engine to the electric machine, and a controller. The controller is programmed to, in response to a request to start the engine with the electric machine, command a target pressure to the disconnect clutch that depends on a seal friction derived from a measured line pressure of the disconnect clutch and a rate change of the measured line pressure.

20 Claims, 5 Drawing Sheets

(51) Int. Cl.
*B60W 10/06* (2006.01)
*B60W 10/08* (2006.01)

(56) References Cited

U.S. PATENT DOCUMENTS

| | | |
|---|---|---|
| 9,260,107 B2 | 2/2016 | Doering et al. |
| 9,340,203 B2 | 5/2016 | Gibson et al. |
| 9,527,505 B1 | 12/2016 | Gibson et al. |
| 9,738,265 B2 | 8/2017 | Johri et al. |
| 10,377,369 B2 | 8/2019 | Meyer et al. |
| 10,800,396 B2 | 10/2020 | Ford et al. |
| 11,643,067 B2 | 5/2023 | Xu et al. |
| 2007/0202989 A1* | 8/2007 | Ortmann ............... B60W 10/08 477/166 |
| 2020/0309256 A1 | 10/2020 | Kim |
| 2022/0163074 A1* | 5/2022 | Cattoor ............... F16D 25/0638 |

OTHER PUBLICATIONS

Haria, H., et al, "Characterization and Modeling of Wet Clutch Actuator for High Fidelity Propulsion System Simulations." SAE Technical Paper 2020-01-1414.

\* cited by examiner

CONTROLS AND METHODS TO CALCULATE CLUTCH TORQUE TO INCLUDE SEAL FRICTION

TECHNICAL FIELD

The present disclosure relates to controlling electrified vehicle powertrains and more specifically to controlling an engine disconnect clutch.

BACKGROUND

A hybrid-electric powertrain includes an engine and an electric machine. The torque (or power) produced by the engine and/or the electric machine can be transferred through a transmission to the driven wheels to propel the vehicle. A traction battery supplies energy to the electric machine. The hybrid powertrain is also capable of performing regenerative braking where the electric machine brakes the vehicle by converting mechanical power into electrical power to recharge the battery.

SUMMARY

According to one embodiment, a hybrid vehicle includes an engine, an electric machine, a disconnect clutch configured to selectively couple the engine to the electric machine, and a controller. The controller is programmed to, in response to a request to start the engine with the electric machine, command a target pressure to the disconnect clutch that depends on a seal friction derived from a measured line pressure of the disconnect clutch and a rate change of the measured line pressure.

According to another embodiment, a hybrid vehicle includes an engine, an electric machine, a disconnect clutch configured to selectively couple the engine and electric machine, and a controller. The controller is programmed to command a target pressure to the disconnect clutch that depends on a seal friction derived from a rate of change of line pressure to the disconnect clutch during a start of the engine with the electric machine.

According yet another embodiment, a method of starting an engine with an electric machine includes, in response to a request to start an engine with an electric machine, commanding a target pressure to a disconnect clutch, that couples the engine and the electric machine, that depends on a seal friction derived from a measured line pressure of the disconnect clutch and a rate change of the measured line pressure.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
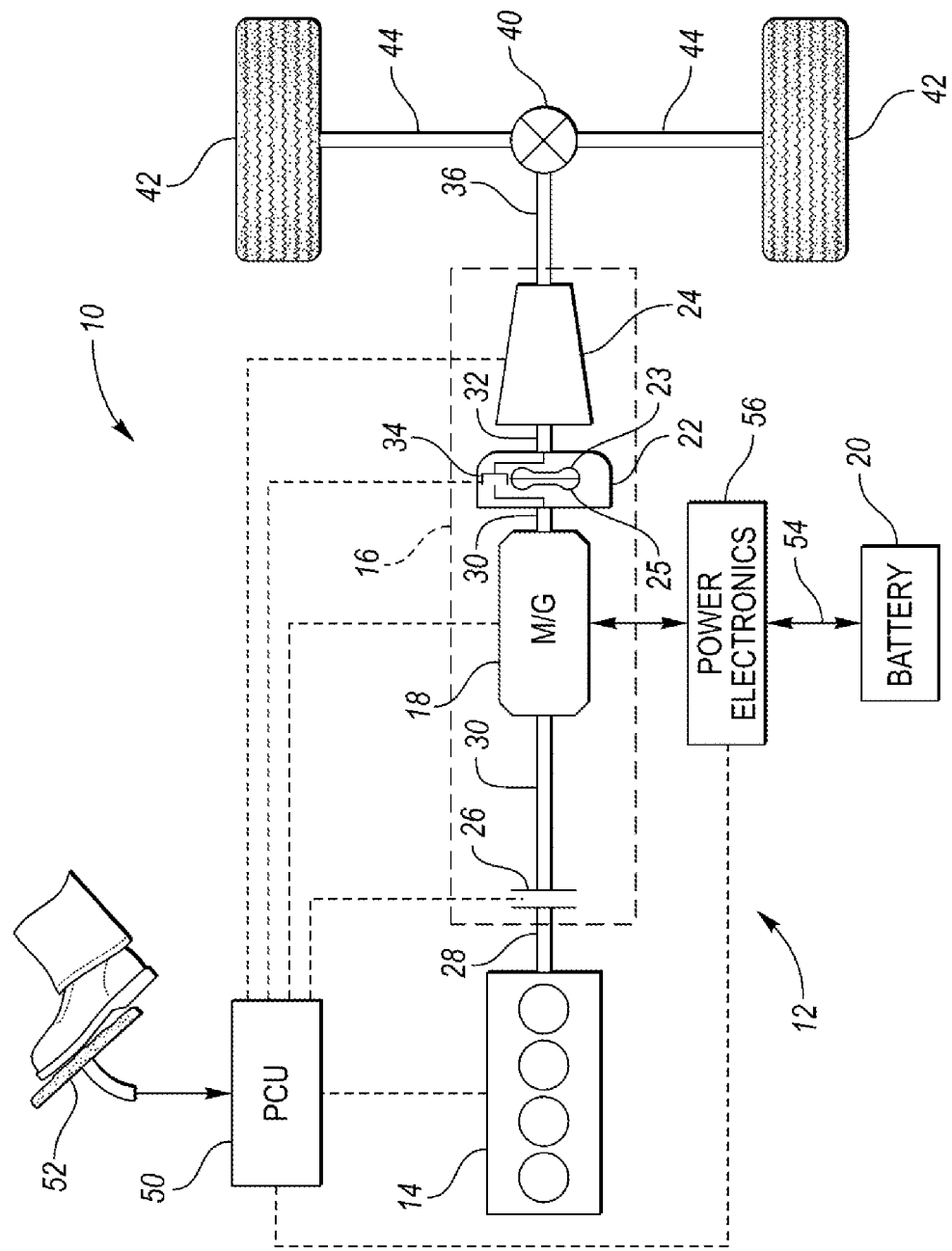
FIG. 1 is a schematic of a hybrid electric vehicle according to one embodiment.

Referring to FIG. 1, a schematic diagram of a hybrid electric vehicle (HEV) 10 is illustrated according to an embodiment of the present disclosure. FIG. 1 illustrates representative relationships among the components. Physical placement and orientation of the components within the vehicle may vary. The HEV 10 includes a powertrain 12. The powertrain 12 includes an engine 14 that drives a transmission 16, which may be referred to as a modular hybrid transmission (MHT). As will be described in further detail below, the transmission 16 includes an electric machine such as an electric motor/generator (M/G) 18, an associated traction battery 20, a torque converter 22, and a multiple step-ratio automatic transmission or gearbox 24. The engine 14, M/G 18, torque converter 22, and the automatic transmission 16 are connected sequentially in series, as illustrated in FIG. 1. For simplicity, the M/G 18 may be referred to as a motor.

The engine 14 and the M/G 18 are both drive sources for the HEV 10 and may be referred to as actuators. The engine 14 generally represents a power source that may include an internal-combustion engine such as a gasoline, diesel, or natural gas powered engine. The engine 14 generates an engine power and corresponding engine torque that is supplied to the M/G 18 when a disconnect clutch 26 between the engine 14 and the M/G 18 is at least partially engaged. The M/G 18 may be implemented by any one of a plurality of types of electric machines. For example, M/G 18 may be a permanent magnet synchronous motor. Power electronics condition direct current (DC) power provided by the battery 20 to the requirements of the M/G 18, as will be described below. For example, power electronics may provide three phase alternating current (AC) to the M/G 18.

When the disconnect clutch 26 is at least partially engaged, power flow from the engine 14 to the M/G 18 or from the M/G 18 to the engine 14 is possible. For example, the disconnect clutch 26 may be engaged and M/G 18 may operate as a generator to convert rotational energy provided by a crankshaft 28 and M/G shaft 30 into electrical energy to be stored in the battery 20. The disconnect clutch 26 can also be disengaged to isolate the engine 14 from the remainder of the powertrain 12 such that the M/G 18 can act as the sole drive source for the HEV 10. Shaft 30 extends through the M/G 18. The M/G 18 is continuously, drivably connected to the shaft 30, whereas the engine 14 is drivably connected to the shaft 30 only when the disconnect clutch 26 is at least partially engaged. When the disconnect clutch 26 is locked (fully engaged), the crankshaft 28 is fixed to the shaft 30.

The engine 14 is started by the M/G 18 rather than using a separate starter motor. To do so, the disconnect clutch 26 partially engages to transfer torque from the M/G 18 to the engine 14. The M/G 18 may be required to ramp up in torque to fulfill driver demands while also starting the engine 14. The disconnect clutch 26 can then be fully engaged once the engine speed is brought up to the speed of the M/G 18.

The M/G 18 is connected to the torque converter 22 via shaft 30. The torque converter 22 is therefore connected to the engine 14 when the disconnect clutch 26 is at least partially engaged. The torque converter 22 includes an impeller 23 fixed to M/G shaft 30 and a turbine 25 fixed to a transmission input shaft 32. The torque converter 22 provides a hydraulic coupling between shaft 30 and transmission input shaft 32. The torque converter 22 transmits power from the impeller 23 to the turbine 25 when the impeller rotates faster than the turbine. The magnitude of the turbine torque and impeller torque generally depend upon the relative speeds. When the ratio of impeller speed to turbine speed is sufficiently high, the turbine torque is a multiple of the impeller torque. A torque converter bypass clutch 34 may also be provided that, when engaged, frictionally or mechanically couples the impeller and the turbine of the torque converter 22, permitting more efficient power transfer. The torque converter bypass clutch 34 may be operated as a launch clutch to provide smooth vehicle launch. Alternatively, or in combination, a launch clutch similar to disconnect clutch 26 may be provided between the M/G 18 and gearbox 24 for applications that do not include a torque converter 22 or a torque converter bypass clutch 34. In some applications, disconnect clutch 26 is generally referred to as an upstream clutch and the launch clutch 34 (which may be a torque converter bypass clutch) is generally referred to as a downstream clutch.

The gearbox 24 may include gear sets, such as planetary gear sets, that are selectively placed in different gear ratios by selective engagement of friction elements such as clutches and brakes to establish the desired multiple discrete or step drive ratios. For simplicity, the gear ratios may be referred to as gears, i.e., first gear, second gear, etc. The friction elements are controllable through a shift schedule that connects and disconnects certain elements of the gear sets to control the speed and torque ratios between a transmission output shaft 36 and the transmission input shaft 32. The gearbox 24 may have six speeds including first through sixth gears. In this example, sixth gear may be referred to as top gear. First gear has the lowest speed ratio and the highest torque ratio between the input shaft 32 and the output shaft 36, and top gear has the highest speed ratio and the lowest torque ratio. The gearbox 24 is automatically shifted from one ratio to another based on various vehicle and ambient operating conditions by an associated controller, such as a powertrain control unit (PCU). The gearbox 24 then provides powertrain-output torque to output shaft 36.

It should be understood that the hydraulically controlled gearbox 24 used with a torque converter 22 is but one example of a gearbox or transmission arrangement; any multiple ratio gearbox that accepts input torque(s) from an engine and/or a motor and then provides torque to an output shaft at the different ratios is acceptable for use with embodiments of the present disclosure. For example, gearbox 24 may be implemented by an automated mechanical (or manual) transmission (AMT) that includes one or more servo motors to translate/rotate shift forks along a shift rail to select a desired gear ratio. As generally understood by those of ordinary skill in the art, an AMT may be used in applications with higher torque requirements, for example.

As shown in the representative embodiment of FIG. 1, the output shaft 36 is connected to a differential 40. The differential 40 drives a pair of wheels 42 via respective axles 44 connected to the differential 40. The differential transmits approximately equal torque to each wheel 42 while permitting slight speed differences such as when the vehicle turns a corner. Different types of differentials or similar devices may be used to distribute torque from the powertrain to one or more wheels. In some applications, torque distribution may vary depending on the particular operating mode or condition, for example.

The powertrain 12 further includes one or more controller 50 such as a powertrain control unit (PCU), an engine control module (ECM), and a motor control unit (MCU). While illustrated as one controller, the controller 50 may be part of a larger control system and may be controlled by various other controllers throughout the vehicle 10, such as a vehicle system controller (VSC). It should therefore be understood that the controller 50 and one or more other controllers can collectively be referred to as a "controller" that controls various actuators in response to signals from various sensors to control functions such as starting/stopping, operating M/G 18 to provide wheel torque or charge battery 20, select or schedule transmission shifts, etc. Controller 50 may include a microprocessor or central processing unit (CPU) in communication with various types of computer-readable storage devices or media. Computer-readable storage devices or media may include volatile and nonvolatile storage in read-only memory (ROM), random-access memory (RAM), and keep-alive memory (KAM), for example. KAM is a persistent or non-volatile memory that may be used to store various operating variables while the CPU is powered down. Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller in controlling the vehicle.

The controller communicates with various vehicle sensors and actuators via an input/output (I/O) interface that may be implemented as a single integrated interface that provides various raw data or signal conditioning, processing, and/or conversion, short-circuit protection, and the like. Alternatively, one or more dedicated hardware or firmware chips may be used to condition and process particular signals before being supplied to the CPU. As generally illustrated in the representative embodiment of FIG. 1, controller 50 may communicate signals to and/or from engine 14, disconnect clutch 26, M/G 18, launch clutch 34, transmission gearbox 24, and power electronics 56. Although not explicitly illustrated, those of ordinary skill in the art will recognize various functions or components that may be controlled by controller 50 within each of the subsystems identified above. Representative examples of parameters, systems, and/or components that may be directly or indirectly actuated using control logic executed by the controller include fuel-injection timing, rate, and duration, throttle-valve position, spark plug ignition timing (for spark-ignition engines), intake/exhaust valve timing and duration, front-end accessory drive (FEAD) components such as an alternator, air conditioning compressor, battery charging, regenerative braking, M/G operation, clutch pressures for disconnect clutch 26, launch clutch 34, and transmission gearbox 24, and the like. Sensors communicating input through the I/O interface may be used to indicate turbocharger boost pressure, crankshaft position (PIP), engine rotational speed (RPM), wheel speeds (WS1, WS2), vehicle speed (VSS), coolant temperature (ECT), intake-manifold pressure (MAP), accelerator-pedal position (PPS), ignition-switch position (IGN), throttle-valve position (TP), air temperature (TMP), exhaust gas oxygen (EGO) or other exhaust gas component concentration or presence, intake-air flow (MAF), transmission gear, ratio, or mode, transmission-oil temperature (TOT), transmission-turbine speed (TS), torque converter bypass clutch 34 status (TCC), deceleration or shift mode (MDE), for example.

Control logic or functions performed by controller 50 may be represented by flow charts or similar diagrams in one or more figures. These figures provide representative control strategies and/or logic that may be implemented using one or more processing strategies such as event-driven, interrupt-driven, multi-tasking, multi-threading, and the like. As such, various steps or functions illustrated may be performed in the sequence illustrated, in parallel, or in some cases omitted. Although not always explicitly illustrated, one of ordinary skill in the art will recognize that one or more of the illustrated steps or functions may be repeatedly performed depending upon the particular processing strategy being used. Similarly, the order of processing is not necessarily required to achieve the features and advantages described herein, but is provided for ease of illustration and description. The control logic may be implemented primarily in software executed by a microprocessor-based vehicle, engine, and/or powertrain controller, such as controller 50. Of course, the control logic may be implemented in software, hardware, or a combination of software and hardware in one or more controllers depending upon the particular application. When implemented in software, the control logic may be provided in one or more computer-readable storage devices or media having stored data representing code or instructions executed by a computer to control the vehicle or its subsystems. The computer-readable storage devices or media may include one or more of a number of known physical devices which utilize electric, magnetic, and/or optical storage to keep executable instructions and associated calibration information, operating variables, and the like.

An accelerator pedal 52 is used by the driver of the vehicle to provide a demanded torque, power, or drive command to propel the vehicle. In general, depressing and releasing the pedal 52 generates an accelerator pedal position signal that may be interpreted by the controller 50 as a demand for increased power or decreased power, respectively. This may be referred to as driver-demanded torque. Based at least upon input from the pedal, the controller 50 commands torque from the engine 14 and/or the M/G 18. The controller 50 also controls the timing of gear shifts within the gearbox 24, as well as engagement or disengagement of the disconnect clutch 26 and the torque converter bypass clutch 34. Like the disconnect clutch 26, the torque converter bypass clutch 34 can be modulated across a range between the engaged and disengaged positions. This produces a variable slip in the torque converter 22 in addition to the variable slip produced by the hydrodynamic coupling between the impeller and the turbine. Alternatively, the torque converter bypass clutch 34 may be operated as locked or open without using a modulated operating mode depending on the particular application.

To drive the vehicle with the engine 14, the disconnect clutch 26 is at least partially engaged to transfer at least a portion of the engine torque through the disconnect clutch 26 to the M/G 18, and then from the M/G 18 through the torque converter 22 and gearbox 24. When the engine 14 alone provides the torque necessary to propel the vehicle, this operation mode may be referred to as the "engine mode," "engine-only mode," or "mechanical mode."

The M/G 18 may assist the engine 14 by providing additional power to turn the shaft 30. This operation mode may be referred to as a "hybrid mode," an "engine-motor mode," or an "electric-assist mode."

To drive the vehicle with the M/G 18 as the sole power source, the power flow remains the same except the disconnect clutch 26 isolates the engine 14 from the remainder of the powertrain 12. Combustion in the engine 14 may be disabled or otherwise OFF during this time to conserve fuel. The traction battery 20 transmits stored electrical energy through wiring 54 to power electronics 56 that may include an inverter, for example. The power electronics 56 convert DC voltage from the battery 20 into AC voltage to be used by the M/G 18. The controller 50 commands the power electronics 56 to convert voltage from the battery 20 to an AC voltage provided to the M/G 18 to provide positive torque (drive torque) or negative torque (regenerative braking) to the shaft 30. This operation mode may be referred to as an "electric only mode," "EV (electric vehicle) mode," or "motor mode."

In any mode of operation, the M/G 18 may act as a motor and provide a driving force for the powertrain 12. Alternatively, the M/G 18 may act as a generator and convert kinetic energy from the powertrain 12 into electric energy to be stored in the battery 20. The M/G 18 may act as a generator while the engine 14 is providing propulsion power for the vehicle 10, for example. The M/G 18 may additionally act as a generator during times of regenerative braking in which rotational energy from spinning wheels 42 is transferred back through the gearbox 24 and is converted into electrical energy for storage in the battery 20. The M/G 18 may be referred to as providing negative torque when acting as a generator.

It should be understood that the schematic illustrated in FIG. 1 is merely exemplary and is not intended to be limiting. Other configurations are contemplated that utilize selective engagement of both an engine and a motor to transmit through the transmission. For example, the M/G 18 may be offset from the crankshaft 28, and/or the M/G 18 may be provided between the torque converter 22 and the gearbox 24. Other configurations are contemplated without deviating from the scope of the present disclosure.

In hybrid vehicles, such as vehicle 10 depicted in FIG. 1, the driveline torque is the summation of the engine torque and the motor torque less any slipping losses at the clutches, such as the disconnect clutch, and other losses. When the engine is pulled down (turned OFF) due to various requests, driveline torque is solely provided by the motor. The engine may be started (pulled up) based on various driver requests to continue providing the propulsive torque required to meet the driver-demanded wheel torques. When the engine and the motor are connected, the requested torque may be based on the driver demand and the engine torque in order to maintain battery state of charge and improve fuel economy.

Figure 2:
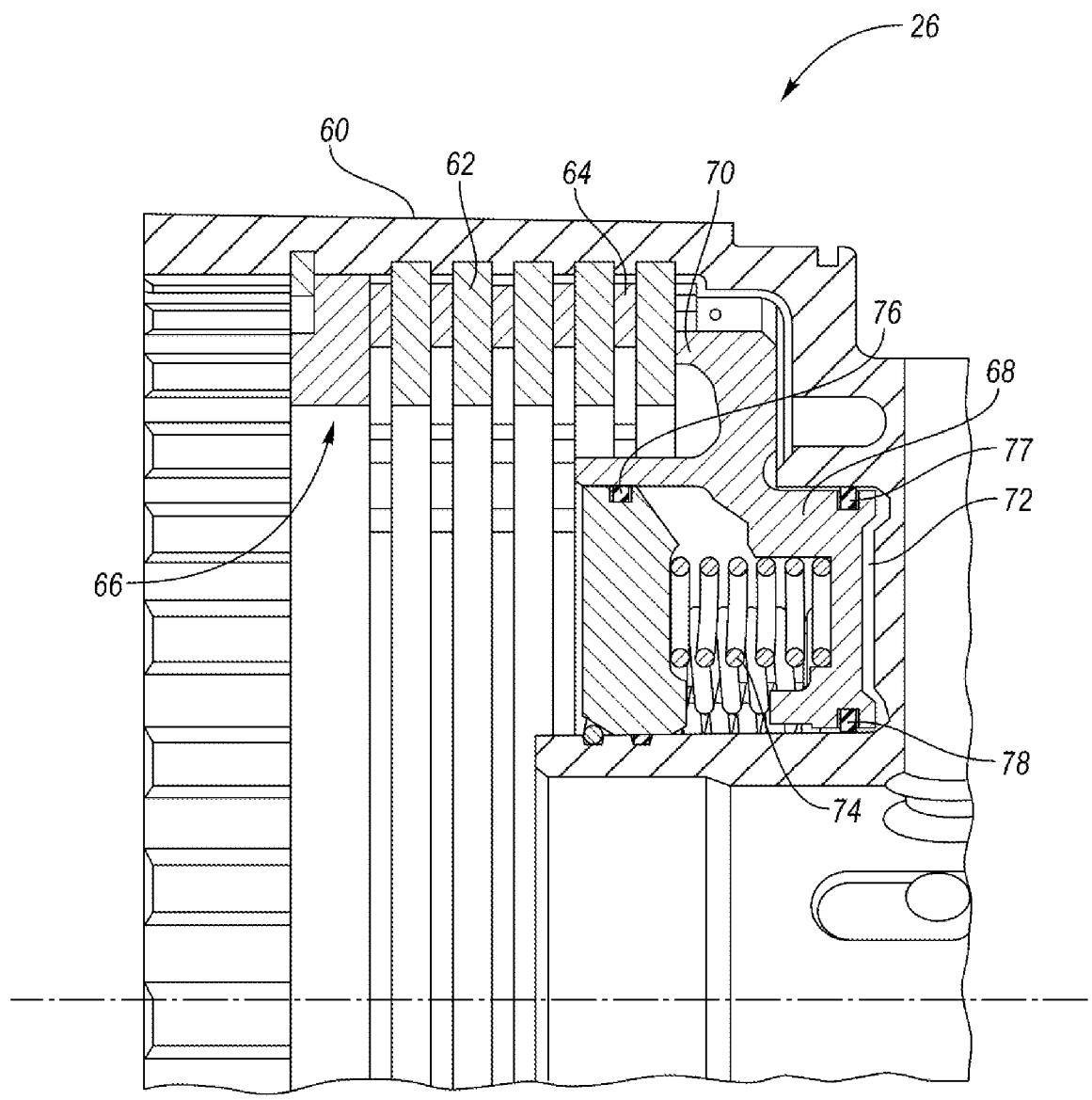
FIG. 2 is a cross-sectional view of the disconnect clutch.

Referring to FIG. 2, the disconnect clutch 26 may be hydraulically actuated, e.g., a wet clutch. The disconnect connect clutch 26 may include a housing 60 that supports a plurality of separator plates 62 that are rotationally fixed to the housing and a plurality of friction plates 64 that are interleaved with the separator plates 62. The friction plates 64 are rotatable relative to the housing. The collection of separator plates 62 and friction plates 64 may be referred to as a clutch pack 66. The housing 60 is rotationally fixed to the engine or the M/G and the friction plates 64 are rotationally fixed to the other of the engine and the M/G. In the example embodiment, the housing 60 is rotationally fixed relative to the crankshaft of the engine and the friction plates 64 are fixed relative to the rotor shaft of the M/G. This is just an example, and any type of disconnect clutch may be used.

The clutch 26 is engaged and disengaged by flowing pressurized fluid to a hydraulic piston 68. The piston 68 includes a portion 70 that contacts the clutch pack 66. Movement of the piston towards the clutch pack (referred to as stroke) frictionally engages the separator plates and the friction plates to engage the clutch. Movement of the piston away from the clutch pack (referred to as de-stroke) disengages the clutch. The piston 68 includes an associated apply chamber 72 that is in fluid communication with a fluid source. Flowing pressured fluid into the chamber 72 strokes the piston 68. Depressurizing fluid in the chamber 72 allows a return spring 74 to de-stroke the piston 68. The piston 68 also includes associated seals 76, 77, and 78. The seals may engage between the piston 68 and portions of the housing 60.

Figure 3:
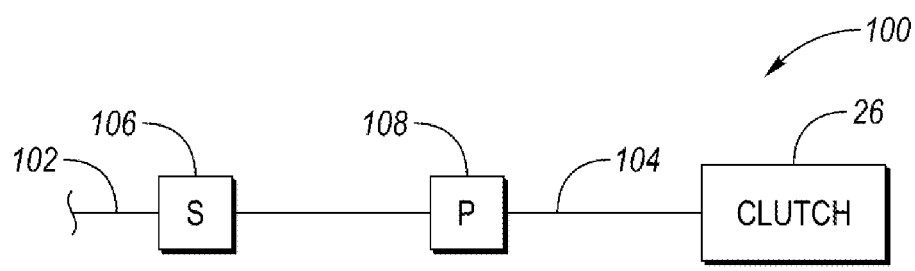
FIG. 3 is a schematic diagram of a hydraulic system for a disconnect clutch.

Referring to FIG. 3, a hydraulic clutch, such as the disconnect clutch 26, may be controlled by a hydraulic system 100 that operates the piston 68 to control clutch torque capacity. The hydraulic system 100 is configured to deliver pressured fluid (oil) to the piston apply chamber 72. The system 100 may be a branch of the hydraulic system of the transmission. The system 100 includes one or more lines, hoses, etc. that connect between the clutch 26 and a fluid source, e.g., a valve body. Fluid within the line 102 is pressurized by a pump or other device. In the simplified example, the line 102 connects to a solenoid 106, e.g., an electrohydraulic valve, or other device capable of controlling an outlet pressure, flow rate, velocity, etc. to line 104. The line 104 connects the clutch 26 to the solenoid 106. During operation of the clutch 26, the solenoid 106 is controlled to vary the fluid pressure, flow rate, etc. sent to the piston chamber 72 to achieve a desired clutch torque capacity. A pressure sensor 108 is configured to sense a measured pressure of the fluid within line 104. The pressure sensor 108 is in electric communication with the controller and is configured to output data indicative of the measured pressure in line 104. The pressure sensor 108 is upstream of the piston chamber 72; therefore, a pressure difference may exist between the measured pressure at the sensor 108 and the pressure inside the piston chamber 72. The vehicle may use modeling to infer the piston apply chamber pressure (or piston pressure) based on the measured pressure from sensor 108. This inferred pressure is sometimes still referred to as a measured pressure as it is based on readings from a pressure sensor.

Figure 4:
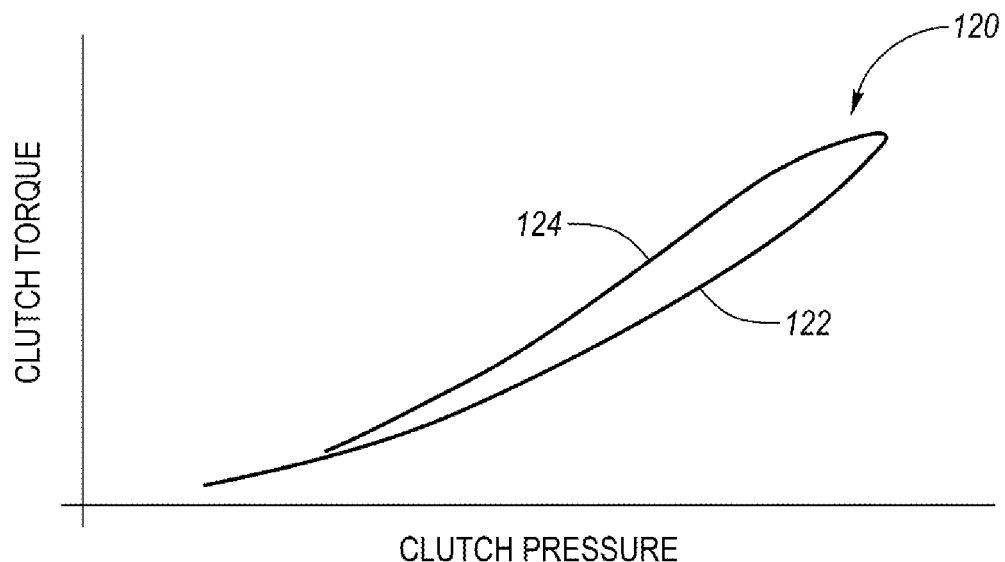
FIG. 4 illustrates a plot of a clutch transfer function.

The torque capacity of a hydraulic clutch is controlled by commanding fluid to the associated piston to increase and decrease pressure applied to the clutch plates. A mathematical relationship between pressure of the hydraulic actuator and the torque capacity of the clutch may be referred to as a clutch transfer function. Such a transfer function may be utilized to control the clutch torque capacity. For example, the transfer function may be utilized to determine the clutch pressure command based on a desired torque capacity of the clutch. FIG. 4 illustrates an example clutch transfer function 120. As can be seen, the transfer function 120 has hysteresis behavior resulting in a single pressure producing two different clutch torque capacities. This is due to the differences in torque observed for a given pressure during stroking and de-stroking the piston. The lower branch 122 models the behavior during stroking of the piston, whereas the upper branch 124 models the behavior during de-stroking of the piston.

In order to accurately model the torque transfer function, many clutch variables must be considered. An often-overlooked variable is the friction between the piston seal and the housing. This may be referred to as seal friction. The seal friction can be quite high and failure to consider it can result in an error as high as 10%. Inclusion of seal friction improves both the clutch pressure command based on the desired torque capacity and the actual clutch torque capacity calculation.

Generally, the forces acting on the clutch pack are the piston force minus the return spring force±the seal friction as shown below in equation 1, where p is the piston chamber pressure, $A_p$ is the area of the piston, $F_{RS}$ is the force of the return spring, and $F_{SF}$ is the force of the seal friction. $F_{SF}$ is negative during stroke and is positive during de-stroke. (When piston pressure is not available, a model may be used to infer the pressure from measured pressure at sensor 108.)

$$F_{net} = pA_p - F_{RS} - F_{SF} \quad \text{(Eq. 1)}$$

The seal friction can be represented as a function of pressure using equation 2, where p=clutch pressure and $T_{oil}$=oil temperature. The piston displacement x indicates the initial transition between static friction and dynamic friction. The piston velocity dx/dt represents the directional dependence as well as the sensitivity of seal friction to the sliding velocity.

$$F_{SF} = f\left(p, x, \frac{dx}{dt}, \text{Toil}\right) \quad \text{(Eq. 2)}$$

Measuring the displacement x and the velocity dx/dt are difficult. To avoid this impracticality, the seal friction model may be approximated as shown in the following equations. In equation 3, dp/dt (the change in pressure) represents the effect of dx/dt and the direction of piston motion x, g is a function indicating that the seal friction offset is a function of p, dp/dt and T, $k_1$ and $k_2$ are calibration parameters for online control processes that may be defined as a function of oil temperature (Toil). The output of equation 3 may be used as an offset (Offset$_{SF}$) in the below equations to determine an accurate clutch torque for a given pressure. The Offset$_{SF}$ may be in units of pressure or force. From equation 3, it can be seen that the seal friction offset is based on at least the pressure, the rate of change of pressure, and the oil temperature.

$$F_{SF}(\text{or } Offset_{SF}) \approx g\left(p, \frac{dp}{dt}, T_{oil}\right) = \text{Sign}\left(\frac{dp}{dt}\right)\left(k_1 p + k_2 \left|\frac{dp}{dt}\right|\right) \quad \text{(Eq. 3)}$$

There are a number of variations to the above equation that may be used to represent the directional and pressure-dependent effects of $F_{SF}$ as a linear function or a non-linear function. One example is to simplify equation 3 to represent pressure dependent seal friction is as shown in equation 4. Again, the output of equation 4 may be used to determine Offset$_{SF}$.

$$F_{SF} \approx \text{Sign}\left(\frac{dp}{dt}\right)(k_1 p) \quad \text{(Eq. 4)}$$

The net force may be used for calculating the clutch torque capacity of the disconnect clutch based on a commanded pressure. Equation 5 illustrates the relationship between clutch pressure (p) and torque capacity (T) while accounting for forces/pressures of the return spring and the seal friction. In equation 5, μ is the coefficient of friction and $R_{eff}$ is the effective clutch radius.

$$T = \mu F_{net} R_{eff} = \mu R_{eff}(pA_p - F_{RS} \pm F_{SF}) \quad \text{(Eq. 5)}$$

The constants $A_p$ and $R_{eff}$ can be represented by a gain and the spring force and seal friction can be represented as offsets, e.g., $Offset_{SF}$ and $Offset_{RS}$. These offsets may be added together to get a combined offset ($Offset_{combined}$) to simplify the calculations as shown in equation 6. Equation 6 may be used by the controller to determine what pressure to command for a desired torque capacity of the clutch.

$$p = \frac{T}{\text{Gain}} + Offset_{combined} \quad \text{(Eq. 6)}$$

Figure 5:
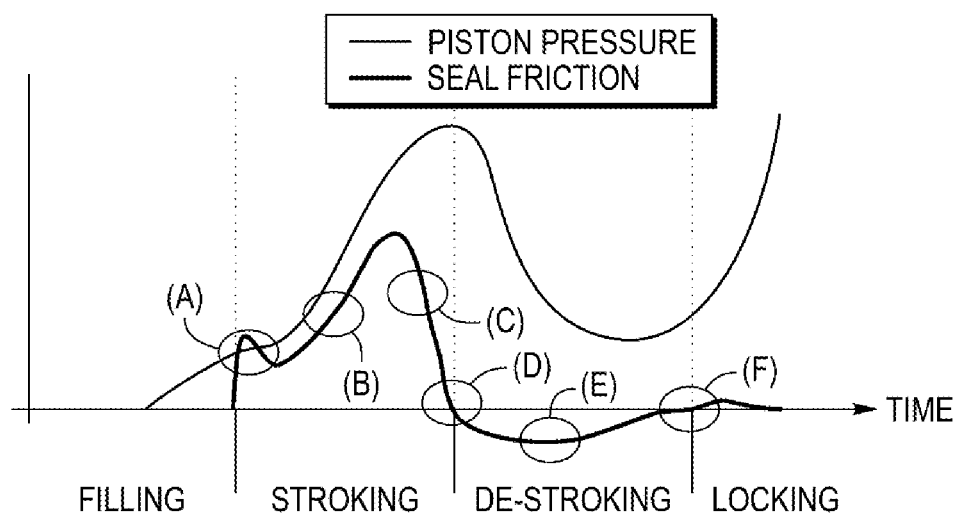
FIG. 5 illustrates plots of piston pressure and seal friction for an example clutch engagement.

Referring to FIG. 5, the seal friction changes during the engagement of the clutch. Actuating the clutch from the fully disengaged state to the fully engaged is shown as having four phases in FIG. 5. The first stage is filling of the piston apply chamber. During this phase, the clutch capacity is nominal and the fluid being sent to the clutch is filling the piston apply chamber. Once the piston chamber is filled, additional fluid entering into the chamber increases the pressure on the piston and once the pressure overcomes the return spring force and the static seal friction, the piston begins the stroking phase where the piston begins to move towards the clutch pack. The seal friction is zero at the beginning of the stroking phase when the piston is stationary, and quickly builds to static level as indicated by the mini-peak at (a). At the beginning of the stroke phase, the seal deforms without sliding and the seal friction is large due to the higher static coefficient of friction. Once the piston starts sliding over the seal after overcoming the static friction (a), the friction drops corresponding to the low piston pressure as a result of the lower dynamic coefficient of friction. During the stroking phase, the seal friction (b) rises in proportion to the pressure and the sliding velocity, which may be equal to the piston sliding velocity. Near the end of the stroke phase, the seal friction (c) starts dropping due to reduced piston motion and drops to zero at (d) as the piston stops once fully stroked. By the end of this stage, the clutch torque capacity is enough for cranking the engine. As the engine is fired, it starts generating torque. To provide a smooth transition from electric-mode to engine-mode, the piston is partially de-stroked by dropping the piston pressure as shown in the de-stroking phase. During the de-stroking phase, the seal friction (e) reverses in direction indicated by the negative sign as the piston is moving in the opposite direction. The seal friction is generally low during the de-stroking phase compared to the stroking phase due to decreasing clutch pressure. A locking phase follows the de-stroking phase and is used to secure the clutch in the fully engaged position when the engine speed reaches the level of the motor speed. To prevent slip, a high pressure is applied. Seal friction (f) is low during the locking phase as piston movement is limited.

As discussed above, the engine may be started using the M/G. To start the engine this way, the disconnect clutch is gradually engaged to pull up the engine. During starting of the engine, a control module calculates a series of desired clutch torque capacities that accelerate the crankshaft from rest and slowly synchronize the speeds between the crankshaft and the rotor shaft, at which point, the clutch may be locked. The following controls focus on determining the appropriate pressures to command to the clutch in order to achieve the desired clutch torque capacities. The controls account for seal friction to improve accuracy.

Figure 6:
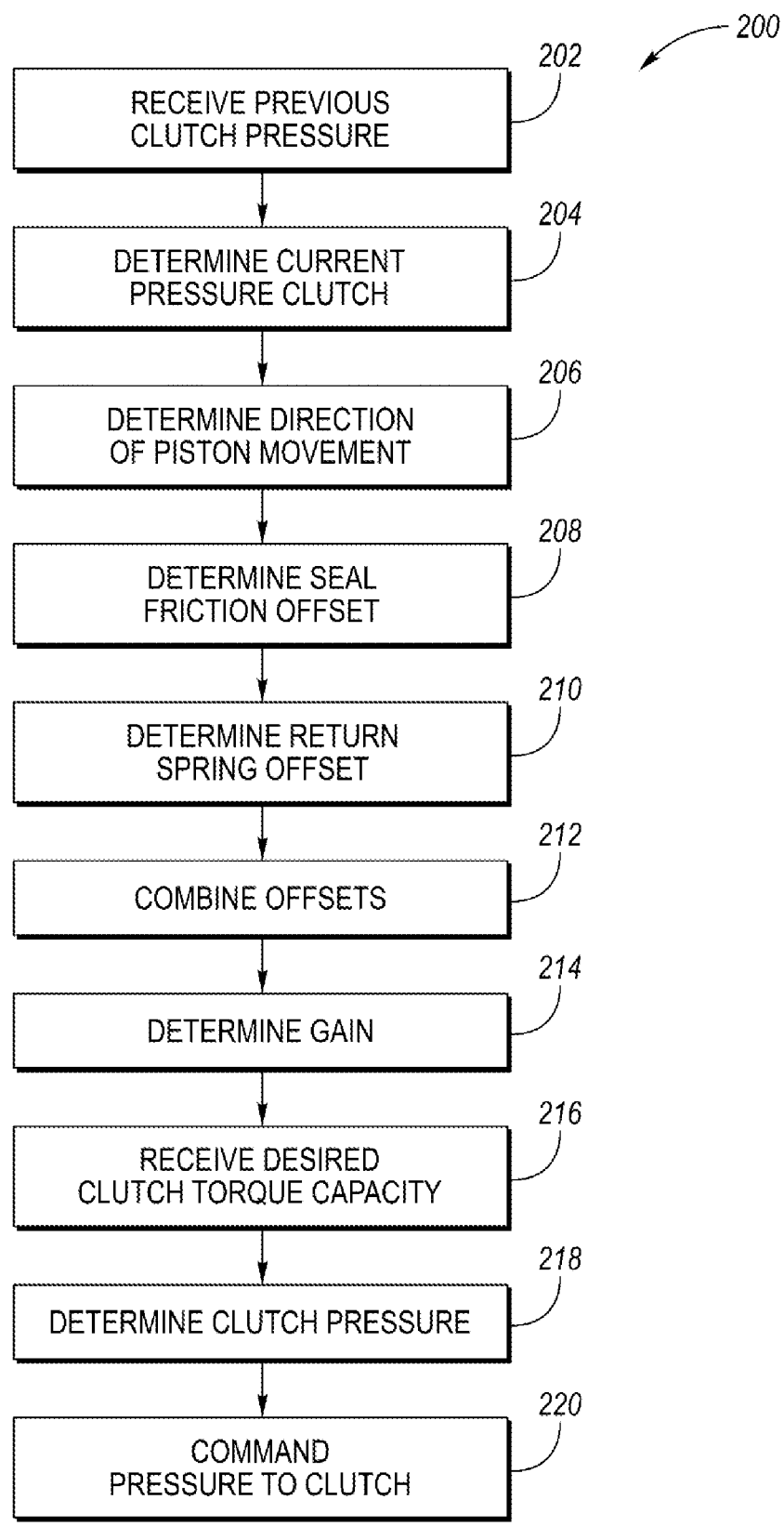
FIG. 6 is a flow chart of an algorithm for determining clutch pressures during starting of the engine.

Referring to FIG. 6, a flowchart 200 of an algorithm for controlling clutch pressures is shown. The controls 200 may be executed in response to a request to start the engine with the electric machine. At operation 202, the controller receives the previous clutch pressure commanded to the clutch. At operation 204, the controller determines a current pressure of the clutch. The current pressure may be the estimated or inferred pressure inside the piston chamber. This pressure may be inferred or estimated based on a measured pressure from a sensor, e.g., sensor 108. At operation 206, the controller determines the direction of piston movement, i.e., stroke or de-stroke. The direction may be determined by comparing the previous clutch pressure of operation 202 and the current clutch pressure of operation 204. That is, the direction of piston motion may be determined by taking the derivative of the pressure with respect to time. If the pressure is increasing, this indicates stroke; if the pressure is decreasing, this indicates de-stroke.

At operation 208, the controller determines the seal friction offset. This may be calculated using the above-described equations. At operation 210, the controller determines the return spring offset. These offsets are combined, e.g., added or subtracted, to determine a combined offset at operation 212. At operation 214, the controller determines the gain (see equation 6) to apply in determining the commanded pressure. The gain is determined based on the constants from Eq. 5, i.e. gain=$\mu R_{eff} Ap$. It is then adjusted during the calibration phase based on variations observed under different use cases and operating conditions.

At operation 216, the controller receives a desired clutch torque capacity for the disconnect clutch. Using equation 6, for example, or other methodology, the controller determines the clutch pressure to command to deliver the desired clutch torque capacity at operation 218.

At operation 220, the controller commands the pressure to the disconnect clutch. For example, the commanded pressure may be sent to a control module associated with controlling the solenoid 106. This control module may convert the commanded pressure into a voltage or current signal that is sent to the solenoid to open or close the valve as desired.

While not shown, the after pressure is commanded, the controller can measure the actual pressure and calculate the true clutch capacity with inclusion of seal friction. The controller can also generate a leading torque signal.

The controls 200 may also be used to control the decoupling of the engine from the M/G, i.e., during disengagement of the clutch. The calculations are similar, but during decoupling, the return spring has a positive sign as it is aiding movement of the piston rather than providing a resistance. The gains and other calibrations may differ to account for the differences between engagement and disengagement of the clutch. See the example clutch transfer function above.

Figure 7:
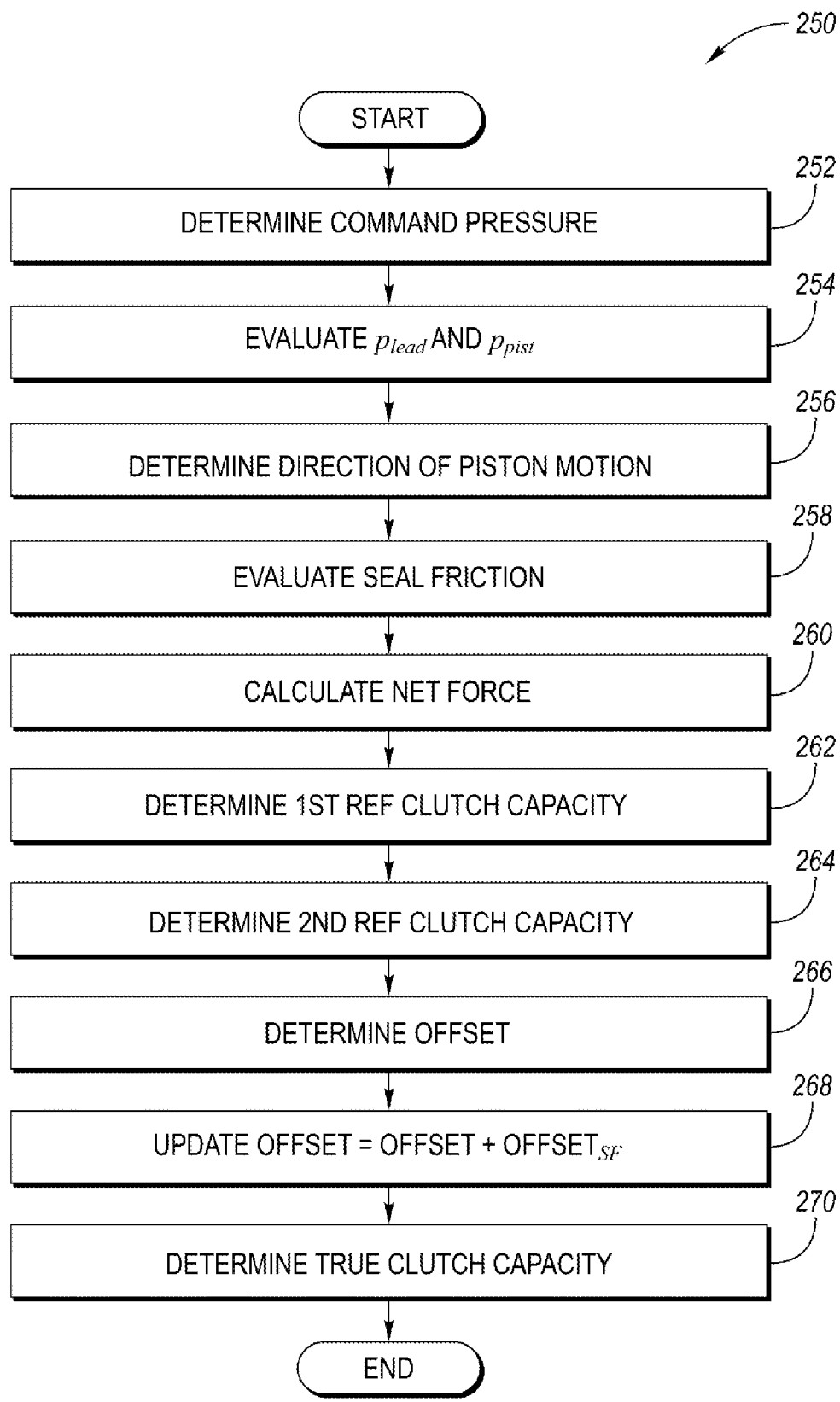
FIG. 7 is another flow chart of another algorithm for determining clutch pressures during starting of the engine.

FIG. 7 illustrates an alternative control strategy 250. The flowchart 250 is a slightly different approach than FIG. 6 to calculate the seal friction offset. In FIG. 6, the controls directly defined offset as a function of (p, dp/dt, and Toil) and explained how the seal friction is used for determining the command pressure based on desired torque capacity. However, the pressure commanded may not always be exactly achieved. The actual measured pressure may be slightly different from the command pressure. Therefore, the controllers can use this measured pressure and determine the true capacity of the clutch (so it can compare this to the desired torque and accordingly adapt the command pressure in the next time instant in case of variation between the two using a technique called adaptive controls). FIG. 7 describes the method for calculating the seal friction force as a function of p, dp/dt, and $T_{oil}$ instead of calculating the seal friction offset. Then, this seal friction force is used along with return spring force, and piston force to calculate the net force using force balance. Once the net force is available, a Coulomb model may be used to calculate clutch torque. Separately, the controller may calculate the clutch capacity from just the gain and offset with a linear transfer function relation that is calibrated as a part of the strategy. The controller may compare the difference between the torque calculated using seal friction and the torque using linear transfer function (which does not include seal friction). The difference in the two gives the seal friction offset. So, based on this, the controller updates the offset used in the strategy. With this updated offset, the true clutch capacity can be calculated using the calibrated gain and pressure value (instantaneous or lead to get Tc and T_lead respectively).

Control begins at operation 252 where the controller determines a commanded pressure. At operation 254, the controller determines a leading pressure response and instantaneous piston pressure. The leading signal is calculated based on the combination of $1^{st}$ order delay applied to the command signal and lead-lag control. The piston pressure is determined using a model based on sensor pressure and estimated flow rate. At operation 256, the controller determines the direction of piston motion e.g., stroke or de-stroke. At operation 258, the controller determines the force of the seal friction. At operation 260, the controller determines the net force acting on the clutch pack using equation 1, for example. Once the net force is known, the controller determines a first reference clutch torque capacity while accounting for seal friction at operation 262. In operation 264, the controller determines a second reference clutch torque capacity based on linear transfer function, which does not include the seal friction contribution. The second reference torque capacity is subtracted from the first reference torque capacity to determine the offset of the seal friction at operation 266. At operation 268, the offset value, which is based only on the return spring force and other factors not including the seal friction, is updated to include seal friction offset (this is the combined offset). At operation 270, a true torque capacity is calculated using the updated offset of operation 268, the clutch gain and the piston pressure.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A hybrid vehicle comprising:
   an engine;
   an electric machine;
   a disconnect clutch configured to selectively couple the engine to the electric machine; and
   a controller programmed to, in response to a request to start the engine with the electric machine, command a target pressure to the disconnect clutch that depends on a seal friction derived from a measured line pressure of the disconnect clutch and a rate change of the measured line pressure.

2. The hybrid vehicle of claim 1, wherein the disconnect clutch includes a housing, a piston, and a seal interposed between the piston and the housing.

3. The hybrid vehicle of claim 1, wherein the seal friction is further derived from oil temperature.

4. The hybrid vehicle of claim 1, wherein the target pressure further depends on a force of a return spring of the disconnect clutch.

5. The hybrid vehicle of claim 1, wherein a first component of the clutch is fixedly coupled to the engine and a second component of the clutch is fixedly coupled to the electric machine.

6. The hybrid vehicle of claim 5, wherein the first component is one of a separator plate and a friction plates and the second component is the other of the separator plate and the friction plate.

7. The hybrid vehicle of claim 1, wherein the controller is further programmed to, in response to a request to disconnect the engine from the electric machine, command a second target pressure to the disconnect clutch that depends on a seal friction derived from the measured line pressure and a rate change of the measured line pressure.

8. The hybrid vehicle of claim 7, wherein the second target pressure further depends on a force of a return spring of the disconnect clutch.

9. The hybrid vehicle of claim 7, wherein the second target pressure further depends on oil temperature.

10. A hybrid vehicle comprising:
    an engine;
    an electric machine;
    a disconnect clutch configured to selectively couple the engine and electric machine; and
    a controller programmed to command a target pressure to the disconnect clutch that depends on a seal friction derived from a rate of change of line pressure to the disconnect clutch during a start of the engine with the electric machine.

11. The hybrid vehicle of claim 10 further comprising a pressure sensor associated with the disconnect clutch and configured to output data to the controller indicative of a measured pressure, and wherein the rate of change of line pressure is based on the measured pressure.

12. The hybrid vehicle of claim 11, wherein the seal friction is further derived from a magnitude of the measured pressure.

13. The hybrid vehicle of claim 12, wherein the seal friction is further based on oil temperature.

14. The hybrid vehicle of claim 10, wherein a first component of the clutch is fixedly coupled to the engine and a second component of the clutch is fixedly coupled to the electric machine.

15. The hybrid vehicle of claim 10, wherein the seal friction is represented by a pressure offset.

16. The hybrid vehicle of claim 15, wherein the target pressure is based on a quotient of the requested torque capacity and a gain, plus the pressure offset.

17. The hybrid vehicle of claim 10, wherein the seal friction is expressed as a force.

18. A method of starting an engine with an electric machine comprising:
  in response to a request to start an engine with an electric machine, commanding a target pressure to a disconnect clutch, which couples the engine and the electric machine, that depends on a seal friction derived from a measured line pressure of the disconnect clutch and a rate change of the measured line pressure.

19. The method of claim 18, wherein the seal friction is represented by a pressure offset.

20. The method of claim 19, wherein the target pressure further depends on a force of a return spring of the disconnect clutch.

* * * * *